United States Patent [19]

Rossigno

[11] Patent Number: 5,312,173
[45] Date of Patent: May 17, 1994

[54] CONTROL VALVE ACTUATOR

[75] Inventor: Louis P. Rossigno, Granger, Ind.

[73] Assignee: AlliedSignal Inc., Morristown, N.J.

[21] Appl. No.: 68,881

[22] Filed: May 28, 1993

[51] Int. Cl.⁵ .............................................. B60T 8/32
[52] U.S. Cl. .............................. 303/113.3; 188/356; 303/114.3; 60/545
[58] Field of Search .............. 303/113.2, 113.3, 113.4, 303/114.3; 180/197; 188/356, 357; 91/369.1, 369.3, 369.2; 60/545, 547.1

[56] References Cited

U.S. PATENT DOCUMENTS

| | | | |
|---|---|---|---|
| 4,505,351 | 3/1985 | Nishikawa et al. | 303/114.3 X |
| 4,708,401 | 11/1987 | Klein | 303/114.3 X |
| 4,778,225 | 10/1988 | Rudolph et al. | 303/113.3 |
| 4,828,332 | 5/1989 | Lohberg | 303/113.3 |
| 4,953,446 | 9/1990 | Fecher et al. | 91/369.1 X |
| 5,096,267 | 3/1992 | Volz | 303/114.3 X |
| 5,152,587 | 10/1992 | Volz | 303/113.3 X |
| 5,188,431 | 2/1993 | Gautier | 188/356 X |

FOREIGN PATENT DOCUMENTS

| | | | |
|---|---|---|---|
| 3800554 | 7/1989 | Fed. Rep. of Germany | 303/114.3 |
| 2224795 | 5/1990 | United Kingdom | 303/114.3 |

Primary Examiner—Douglas C. Butler
Attorney, Agent, or Firm—Leo H. McCormick, Jr.; Ken C. Decker

[57] ABSTRACT

A traction servomotor for supplying a control valve with an operational input independently of an operator pedal assembly in response to a signal supplied to a controller indicating a different rotational spin of the wheels of a vehicle. The traction servomotor has a housing with an input rod with a first section retained in axial openings in the housing and a second section is pivotally connected to the operator pedal assembly. The interior of the housing is divided by a diaphragm which is attached to the first portion of the input rod. The controller is connected to the housing such that in a first mode of operation wherein the activation of the control valve is dependent on an input from the operator pedal assembly a first fluid pressure is presented to both sides of the diaphragm and in a second mode of operation, a second fluid pressure is presented to one side of the diaphragm to create an actuation pressure differential. The actuation pressure differential acts on and moves the input rod to activate the control valve. Activation of the control valve allows an operational pressure differential to be created in a brake booster and an ECU thereafter selectively controls the communication of pressurized fluid to the driving wheels to effect a brake application in the wheels and absorb some driving torque to synchronize the rotational spin of the wheels.

6 Claims, 2 Drawing Sheets

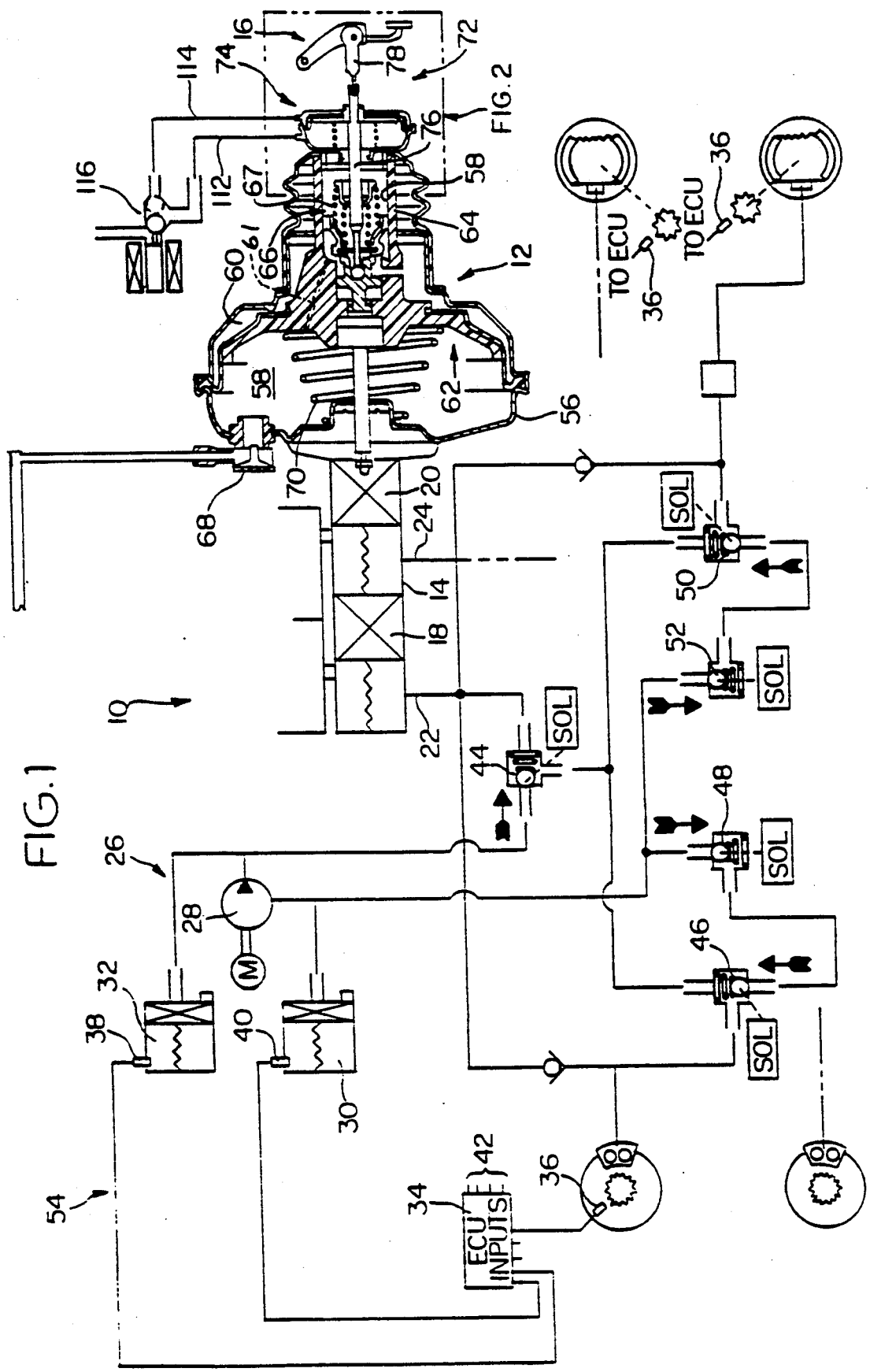

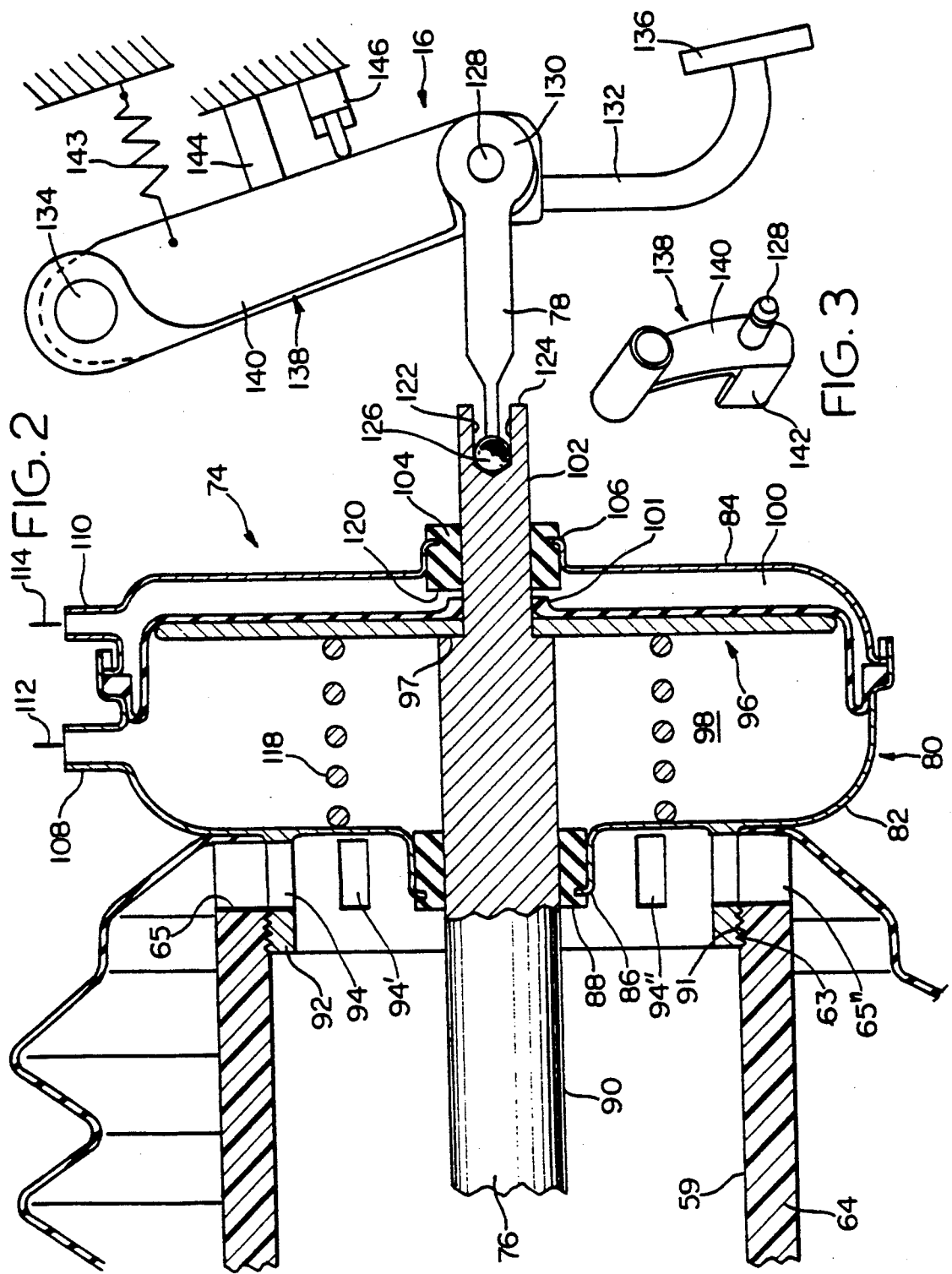

CONTROL VALVE ACTUATOR

This invention an input member having an input rod with first and second sections through which a control valve of a vacuum booster is selectively activated to effect a brake application from either a force developed by a traction servomotor in response to a signal indicating differences in the rotational spin of the wheels of a vehicle or an operator supplied force.

Traction control circuits have been incorporated into anti-lock brake system to provide a way of synchronizing the rotational spin of the wheels of a vehicle. U.S. Pat. Nos. 4,778,225, 5,096,267 and 5,176,433 illustrate structure to accomplish such traction control in a manner acceptable to most vehicle operators. Unfortunately, during the activation of the traction control, the brake pedal which is directly connected to the movable wall of the vacuum brake booster moves during the activation of the traction control circuits or in order to incorporate the traction control structure into the brake system, the vacuum brake booster must be modified through the addition of various internal and external conduits which can significantly increase the cost of a brake system.

In the present invention, a resultant brake booster derived from a standard production brake booster through the addition of a traction servomotor which is added as a modification to the input member. The input member designed to be responsive to an either an input force applied through a operator pedal assembly or an input force produced by a traction servomotor responding to a signal derived from a difference in rotational spin of the drive wheels to effect a brake application of the wheels in a vehicle. The traction servomotor has a housing formed by securing a front shell to a rear shell. The front shell is attached to a rearward projection extending from the movable wall of the brake booster. A first section of an input rod which is retained in axial openings in the first and second shell is directly connected to a control valve of the brake booster and pivotally connected to a second section of the input rod attached to the operator pedal assembly. A diaphragm assembly located between the first and second shells separates a first radial opening in the first shell from a second radial opening in the second shell. The first and second radial openings are connected to a controller which in turn is connected to a first source of pressurized fluid and a second source of pressurized fluid. In a first mode of operation, the first source of pressurized fluid is communicated through the first and second radial openings by way of the controller to allow the diaphragm to remain stationary when an input force is applied to the control valve from the operator pedal assembly to effect a brake application. In a second mode of operation, an input signal derived in an ECU is supplied to the controller when the rotational spin of the wheels of the vehicle differs a predetermined amount. The input signal activates the controller which directs pressurized fluid from a second source to the second radial opening to create an actuation pressure differential across the diaphragm assembly. The actuation pressure differential acts on the diaphragm assembly which moves the input rod to activate the control valve and create an operational pressure differential which produces a corresponding output force in the brake booster. The booster output force pressurizes fluid in the master cylinder which is selectively supplied to the wheels by the ECU to effect a brake application and thereby synchronize the rotational spin of the drive wheels of the vehicle.

The invention as disclosed herein offers an advantage over known brake system since the input member can be added onto a standard vacuum brake booster to provide traction control for the wheels of a vehicle.

It is an object of this invention to provide a vacuum brake booster with an input member through which a control valve can be activated through either an operator pedal assembly or a traction servomotor to effect a brake application in the wheels of a vehicle.

These advantages and objects should be apparent from reading the specification while viewing the drawings wherein:

FIG. 1 is a schematic illustration of a brake system having traction control system with a traction servomotor made according to the present invention attached to an input rod of a booster whereby an operational input force may be independently supplied to a control valve of the brake booster by either the traction servomotor or an operator pedal assembly;

FIG. 2 is an enlarged view of the circumscribed area 2 of FIG. 1 showing the traction servomotor and pedal assembly; and FIG. 3 is a view of a bracket of the pedal assembly of FIG. 1.

The brake system 10 shown in the drawing includes a vacuum brake booster 12 which is connected to a master cylinder assembly 14 which is connected to the wheels of the vehicle to effect a brake application in response to an operator input force supplied through pedal assembly 16.

The master cylinder 14 is of a type as disclosed in U.S. Pat. No. 4,474,005 wherein pressurized fluid created through movement of pistons 18 and 20 is supplied through primary and secondary circuits 22,24 to the appropriate wheels. Further, the master cylinder 14 is connected to a pump back type anti-lock brake system 54, such as disclosed in U.S. Pat. No. 4,778,226, which includes an assembly 26 with a motor driven pump 28, sump 30, accumulator 32 and an electronic control unit (ECU) 34. The electronic control unit (ECU) 34 continually receives input signals from wheel speed sensors 36 which sense rotational spin of the individual wheel and various pressure and position switches 38, 40 associated with the sump 30 and accumulator 32. Based on information derived from these input signals, ECU 34 generates output signals at terminals 42 to control a plurality of solenoid actuated valves 44,46,48, 50 and 52, for simplicity only the valves for circuit 22 are illustrated in the drawing but a similar number would be required for circuit 24. During a brake application, the signals from ECU 34 control the operation of the valves in brake circuits 22 and 24 to prevent wheel skid.

The vacuum brake booster 12 which is of a type as disclosed in U.S. Pat. No. 4,953,446 has a housing 56 which is separated into a front chamber 58 and a rear chamber 60 by a movable wall 62. The movable wall 62 has rearward cylindrical projection 64 which extends through the housing 56 with a bore 59 therein for retaining a control valve 66. Chamber 58 is connected through check valve 68 to a source of vacuum, normally the intake manifold of an internal combustion engine in the vehicle. The movable wall 62 has internal passages, one of which is shown by dashed line 61, through which chamber 58 is connected to chamber 60 depending on the position of control valve 66. When the internal combustion engine is operating, vacuum normally evacuates air from chamber 58 and 60 to allow return spring 70 to position movable wall 62 as shown in FIG. 1. The operation of control valve 66 is provided by an input arrangement 72 located between push rod assembly 16 and control valve 66.

The input assembly 72 which includes traction servomotor 74, first push rod 76, second push rod 78 and pedal arrangement 16 is best shown in FIG. 2. The traction servomotor 74 has a housing 80 formed by securing a front shell 82 to a rear shell 84. The front shell 82 has an axial opening 86 therein with a seal 88 which engages a first diameter 90 on push rod 76 and an annular projection 92 with threads 91 which screw into corresponding threads 63 on the cylindrical projection 64 to attach housing 80 to the movable wall 62. The annular projection 92 has a series of slots 94, 94'...94" which are aligned with corresponding slots 65, 65'..65" on the cylindrical projection 64 to provide a flow path for environmental air into bore 59. The front shell 82 is separated from the rear shell 84 by a plate and diaphragm assembly 96 to define a first chamber 98 and a second chamber 100. Push rod 76 has a second diameter 102 which extends through plate and diaphragm assembly 96 and seal 104 in axial opening 106 in rear shell 84. Front shell 82 has a radial opening 108 and rear shell has a radial opening 110 which are connected by conduits 112 and 114, respectively, to a three way solenoid actuated control valve 116. Servo return spring 118 which is located in chamber 98 acts on and urges plate and diaphragm assembly 96 toward a stop 120 formed by seal 104 located in rear shell 84. Further, control valve return spring 67 also acts on plate and diaphragm assembly 96 through shoulder 97 on push rod 76 to urge the plate and diaphragm assembly 96 toward stop 120.

Since push rod 76 is held in substantially axial alignment with the axial center of the cylindrical projection 64 by bearing surfaces formed by stationary seals 88 and 104 of shells 82 and 84, it is necessary to provide a socket 122 on the end 124 of the second diameter 102 of push rod 76 to receive semi-spherical head 126 of push rod 78 attached to pin 128 of pedal assembly 16 by eye 130.

The pedal assembly 16 includes arm 132 with an end attached to pivot pin 134 and pad 136 through which an operator input is applied and an adapter 138. Adapter 138, which is best shown in FIG. 3, is also located on pivot pin 134 has a rectangular member 140 which carries pin 128 is substantially parallel to arm 132. A flange 142 which extends at substantially a right angle from rectangular member 140 is designed to engage and communicate any input force applied to pad 136 to push rod 78 by way of are 132, pin 128 and eye 130. A pedal return spring 143 acts on and positions are 132 against pedal stop 144 and stop light switch 146 when no force is applied to pad 136.

Under normal operating conditions of the vehicle, vacuum created at the intake manifold of the engine evacuates air from chambers 58 and 60 in housing 56 through check valve 68 to allow return spring 70 to position movable wall 62 in the rest position shown in FIG. 1. At the same time, controller or three way solenoid actuated control valve 116 which is also connected to the intake manifold and to ECU 34 allows a first fluid pressure (vacuum) to be communicated to the first and second radial openings 108,110 in the traction servomotor 74. With the first fluid pressure in chambers 98 and 100, return spring 118 positions diaphragm assembly 96 against stop 120 in shell 84.

In response to an operator applied input to pad 136, arm 132 pivots around pin 134 and supplies push rod 78 with an input force by way of flange 142 in adapter 138 and pin 128. Spherical head 126 rotates in socket 122 to provide push rod 76 with a manual and linear input which moves or actives operate control valve 66. Initial movement of control valve terminates vacuum communication to chamber 60 and movement thereafter allows air to be communicated to chamber 60 from the surrounding environment by way of bore 59, slots 94, 94'...94" in the annular projection on shell 82 and slots 65, 65'...65" in the annular projection 64 on the movable wall 62. With air in chamber 60 and vacuum present in chamber 58, an operation pressure differential is created across movable wall 62 which produces an output force to effect a brake application in a manner as described in U.S. Pat. No. 4,953,446. When sensors 36 supply ECU 34 with a sensed condition that an anti-lock function is appropriate, this functional operation is incorporated in the system in accordance with the teachings disclosed in U.S. Pat. No. 4,953,446. It should be noted that during a operator initiated brake application through an input force applied to the pedal assembly 16, plate and diaphragm assembly 96 of traction servomotor 74 remains stationary as the second diameter section 102 of push rod 76 slides with respect to bead 101 in order for all of the manual input to be supplied to control valve 66.

In the event input signals from sensors supplied to ECU 34 determines a difference in the rotational spin of the driving wheels of vehicle exceeds a predetermined value, appropriate control signals are outputted by terminals 42 to activate controller or three way solenoid actuated control valve 116. Initial activation of control valve 116 terminates communication of the first source of pressurized fluid (vacuum) to chamber 98 in the traction servomotor 74 and thereafter allows the second source of pressurized fluid (environmental air) to be communicated to chamber 100 to create a traction control pressure differential. The traction control pressure differential acts on and moves the plate and diaphragm assembly 96 into engagement with shoulder 97 on push rod 76 to move and provide control valve 66 with an operational input force. Initial movement of control valve 66 terminates vacuum communication to chamber 60 and thereafter allows environmental air to flow to chamber 60 by way of bore 58, slots 94, 94'...94" in the annular projection on shell 82 and slots 65, 65'...65" in the annular projection 64 on the movable wall 62. With air in chamber 60 and vacuum present in chamber 58, an operation pressure differential is created across movable wall 62 which produces an output force to effect a brake application in a manner as described in U.S. Pat. No. 4,953,446. ECU 34 selectively controls the communication of pressurized fluid from the master cylinder 14 to the individual driving wheels to effect braking thereof which absorb a portion of an operational torque applied to drive the wheel to thereby synchronize the rotational spin of the driving wheels. It should be noted that during the operation of brake booster 12 by activation of controller 116 and the operation of traction servomotor 74, arm 132 is held in a stationary position by the spring 143 since adapter 138 can independently pivot on pin 134.

I claim:

1. In a brake system having a vacuum booster with a control valve responsive to a first input signal from an input member in a first mode of operation and a second input signal from a controller in a second mode of operation for developing an operational pressure differential between a control fluid and a source of vacuum fluid across a movable wall in said vacuum brake booster to create an output force for pressurizing fluid in a master cylinder to effect a brake application, said second input signal being derived from differences in the rotational spin of the drive wheels of a vehicle, said controller in said second mode of operation selectively supplying pressurized fluid to effect braking of said drive wheels to absorb a portion of an operational torque applied thereto and thereby synchronize the rotational spin of said drive wheels, said input member being characterized by a housing formed by securing a front shell to a rear shell, said front shell having a first axial opening therein, an annular projection extending therefrom and a first radical opening, said rear shell having a second axial opening therein and a second radical opening, said rear shell having a second axial opening therein and a second movable wall in said vacuum booster, said annular projection having a plurality of slots therein through which control fluid is communicated to said control valve for developing said operational pressure differential across said movable wall, an input rod sealingly and slidably located in said first and second axial openings in said front shell and rear shell, respectively, said input rod being connected to said control valve and an operator pedal assembly, and diaphragm means located between said front and rear shells to separate said first radical opening in said front shell from said second radical opening in the rear shell, said diaphragm means sealingly engaging said input rod, said controller being connected to said control fluid and said source of vacuum, said controller in said first mode of operation allowing said vacuum to be communicated to said diaphragm means through said first and second radical openings to allow resilient means to urge said diaphragm means toward said rear shell and allow said input rod to provide said control valve with an input force and in a second mode of operation allowing control fluid to communicate with said second radial opening to create an actuation pressure differential across said diaphragm means, said actuation pressure differential acting on and independently moving said input rod after overcoming said resilient means to activate said control valve and thereafter allow said control fluid to create said operational pressure differential for moving said movable wall in the vacuum booster to effect a brake application.

2. In the brake system as recited in claim 1 wherein said input rod includes a first section connected to said control valve and a second section connected to said operator pedal assembly, said first section being retained is axial alignment by a first guide in said movable wall and a second guide formed by said front shell surrounding said first axial opening.

3. In the brake system as recited in claim 2 wherein said input rod further includes pivotal means to allow input from said operator pedal assembly to be transmitted along said axial alignment of said first section.

4. In the brake system as recited in claim 3 further including means to permit independent movement of said input rod without movement of said operator pedal assembly.

5. In the brake system as recited in claim 4 wherein said first section of said input rod includes a shoulder, said diaphragm means engaging said shoulder to move provide said control valve during said second mode of operation.

6. In the brake system as recited in claim 5 wherein said rear shell on said housing forms a stop for defining a rest position for said control valve.

* * * * *